(12) United States Patent
Puschnigg et al.

(10) Patent No.: US 7,964,989 B1
(45) Date of Patent: Jun. 21, 2011

(54) METHOD AND SYSTEM FOR CONTROLLING POWER TO AN ELECTRICALLY POWERED DEVICE

(75) Inventors: Greg Puschnigg, Ligonier, PA (US); Michael Krummey, Harrison City, PA (US)

(73) Assignee: Green Power Technologies, LLC, King of Prussia, PA (US)

( * ) Notice: Subject to any disclaimer, the term of this patent is extended or adjusted under 35 U.S.C. 154(b) by 0 days.

(21) Appl. No.: 12/878,040

(22) Filed: Sep. 9, 2010

(51) Int. Cl.
*H02J 3/14* (2006.01)
(52) U.S. Cl. .......................................... 307/38; 307/116
(58) Field of Classification Search ............... 307/11, 307/38–41, 112, 116, 125, 139; 700/18–19, 700/86
See application file for complete search history.

(56) References Cited

U.S. PATENT DOCUMENTS

| | | | |
|---|---|---|---|
| 5,880,677 A | 3/1999 | Lestician | |
| 6,642,852 B2 | 11/2003 | Dresti et al. | |
| 6,813,525 B2 | 11/2004 | Reid et al. | |
| 6,870,463 B2 | 3/2005 | Dresti et al. | |
| 7,171,461 B2 | 1/2007 | Ewing et al. | |
| 7,184,848 B2 | 2/2007 | Krzyzanowski et al. | |
| 7,772,717 B2 | 8/2010 | Kitamura et al. | |
| 2007/0115695 A1 | 5/2007 | Lou et al. | |
| 2010/0079001 A1 | 4/2010 | Lee et al. | |
| 2010/0096925 A1 | 4/2010 | Lee et al. | |

*Primary Examiner* — Jared J Fureman
*Assistant Examiner* — Carlos Amaya
(74) *Attorney, Agent, or Firm* — Clause Eight IPS; Michael Catania

(57) ABSTRACT

A system and method for remotely controlling power to an electrically powered device in a simple and efficient manner is disclosed herein. The system comprises an apparatus, an electrically-powered device and a controller. The apparatus comprises a cord, an alternating current outlet socket, an alternating current input plug, a latching relay, a processor and a transceiver. The system preferably uses a WiFi communication signal to transmit commands from the remote controller to the apparatus.

4 Claims, 15 Drawing Sheets

METHOD AND SYSTEM FOR CONTROLLING POWER TO AN ELECTRICALLY POWERED DEVICE

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to controlling power to an electrically powered device. More specifically, the present invention relates to a system and method for controlling power to an electrically powered device.

2. Description of the Related Art

End Users are becoming increasingly empowered to manage and save electrical power in their everyday lives. They understand that small changes in their behavior coupled with the use of smart power saving devices can minimize their power usage and save on their perpetually increasing energy bills. Additionally, End Users are continually searching for ways to have more control and customization over their environment for enhanced aesthetics and personal preferences and convenience.

The prior art discusses various method and systems for controlling power to an electrically power device.

One example is Dresti et al., U.S. Pat. No. 6,642,852 for a Remote Control Device With Appliance Power Awareness which discloses placing a device in a desired powered state through use of a infrared remote with radiofrequency capabilities.

Another is Lou et al, U.S. Patent Publication Number 2007/0115695 for a Power Supply With Low Standby Loss.

Yet another is Ewing et al., U.S. Pat. No. 7,171,461 for a Network Remote Power Management Outlet Strip.

Yet another is Lee et al., U.S. Publication Number 2010/0079001 for a Outlet Switch Socket Device.

The prior art fails to disclose a system and method for remotely controlling power to an electrically powered device in a simple and efficient manner.

BRIEF SUMMARY OF THE INVENTION

The present invention provides a system and method for controlling power to an electrically powered device in a novel and efficient manner. The present invention provides an effective component for power savings, control and customization for commercial and residential buildings.

One aspect of the present invention is a system for power control with remote WiFi management using web based user interfaces accessible by a home PC, an office laptop or a smartphone such as an iPHONE available from Apple, Inc. The system is applicable to commercial and residential buildings. The features afforded to end-users (commercial building managers or homeowners) by the present invention allow for substantial reduction in energy consumption without having to rewire a building.

The present invention is designed and positioned as an easy to use and safe enhancement for controlling power to electrical devices by building managers, information technology managers and homeowners. The present invention relies on existing technologies, protocols to adhere to all necessary safety and regulatory requirements.

One aspect of the present invention is a system for controlling electrical power to an electrically-powered device. The system comprises an apparatus, an electrically-powered device and a controller. The apparatus comprises a cord, an alternating current outlet socket, an alternating current input plug, a latching relay, a processor and a transceiver. The alternating current outlet socket receives a plug from an electrically-powered device. The alternating current outlet socket is located at a first end of the cord. The alternating current input plug connects to an outlet to receive power. The alternating current outlet socket is located at a second end of the cord. The latching relay controls power to the alternating current outlet socket. The latching relay is electrically positioned within the cord between the alternating current input plug and the alternating current outlet socket. The processor is configured to instruct the latching relay to enable electrical power to the alternating current outlet socket and to disable electrical power to the alternating current outlet socket. The transceiver receives a plurality of commands to the apparatus from the controller utilizing a WIFI communication protocol. The transceiver transmits information from the apparatus utilizing a WIFI communication protocol. The transceiver is in electrical communication with the processor. The transceiver comprises an antenna that extends along a substantial length of the cord. The electrically-powered device is connected to the at least one power outlet connection of the at least on apparatus. The controller transmits a plurality of commands to the at least one apparatus utilizing a WIFI communication protocol. A command of the plurality of commands from the controller can control electrical power to the electrically powered device through the processor of the at least one apparatus which is configured to control electrical power to the electrically powered device from the at least one power outlet connection.

The antenna of the transceiver of the cord preferably extends along the entire length of the cord.

The length of the cord preferably ranges from four feet to ten feet, and the processor, latching relay and transceiver are located in a center region of the cord, with the center region having a length ranging from one foot to two feet.

Another aspect of the present invention is a system for controlling electrical power to an electrically-powered device. The system comprises an apparatus, an electrically-powered device, a controller and at least one wireless router. The apparatus comprises a cord, an alternating current outlet socket, an alternating current input plug, a latching relay, a processor and a transceiver. The alternating current outlet socket receives a plug from an electrically-powered device. The alternating current outlet socket is located at a first end of the cord. The alternating current input plug connects to an outlet to receive power. The alternating current outlet socket is located at a second end of the cord. The latching relay controls power to the alternating current outlet socket. The latching relay is electrically positioned within the cord between the alternating current input plug and the alternating current outlet socket. The processor is configured to instruct the latching relay to enable electrical power to the alternating current outlet socket and to disable electrical power to the alternating current outlet socket. The transceiver receives a plurality of commands to the apparatus from a remote controller through a wireless router. The transceiver transmits information from the apparatus. The transceiver is in electrical communication with the processor. The transceiver extends along at least 80% of the length of the cord. The electrically-powered device is connected to the at least one power outlet connection of the at least one apparatus. The controller transmits a plurality of commands to the at least one apparatus. The at least one wireless router receives each of the plurality of commands from the controller and wirelessly transmits each of the plurality of commands to the transceiver of the at least one apparatus. A command of the plurality of commands from the controller can control electrical power to the electrically powered device through the processor of the at least one apparatus which is configured to control electrical power to the electrically powered device from the at least one power outlet connection.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
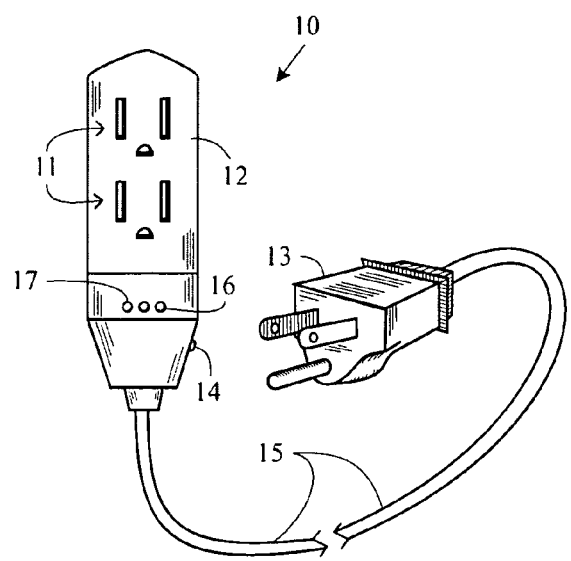
FIG. 1 is a front view of an apparatus for controlling power to an electrically powered device.
Figure 2:
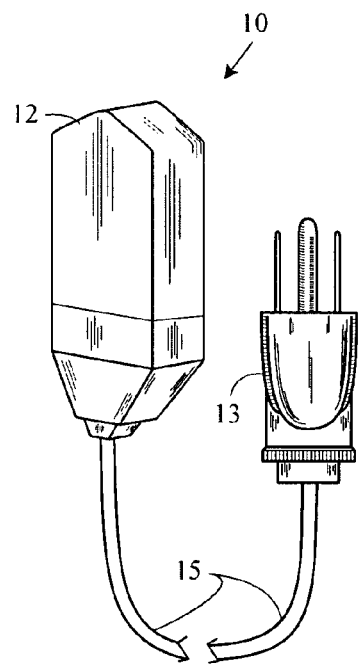
FIG. 2 is a back perspective view of the apparatus of FIG. 1.
Figure 3:
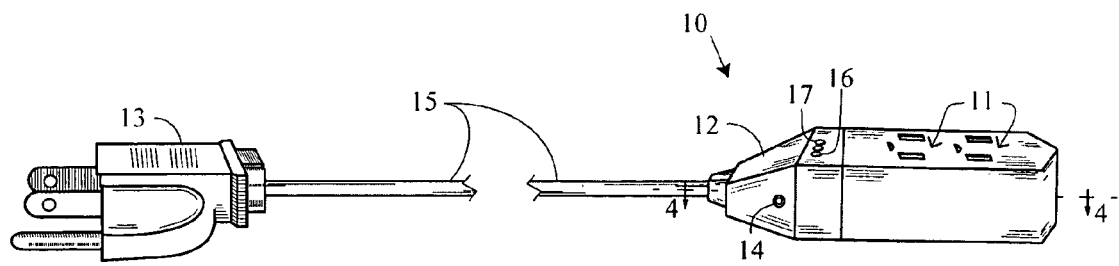
FIG. 3 is a top perspective view of the apparatus of FIG. 1.

A preferred embodiment of an apparatus 10 utilized for controlling power to an electrically powered device is shown in FIGS. 1-3, in the form of an extension cord. The apparatus 10 comprises of at least one controlled socket 11, a casing 12, a plug 13, a switch 14, and a cord 15.

Figure 4:
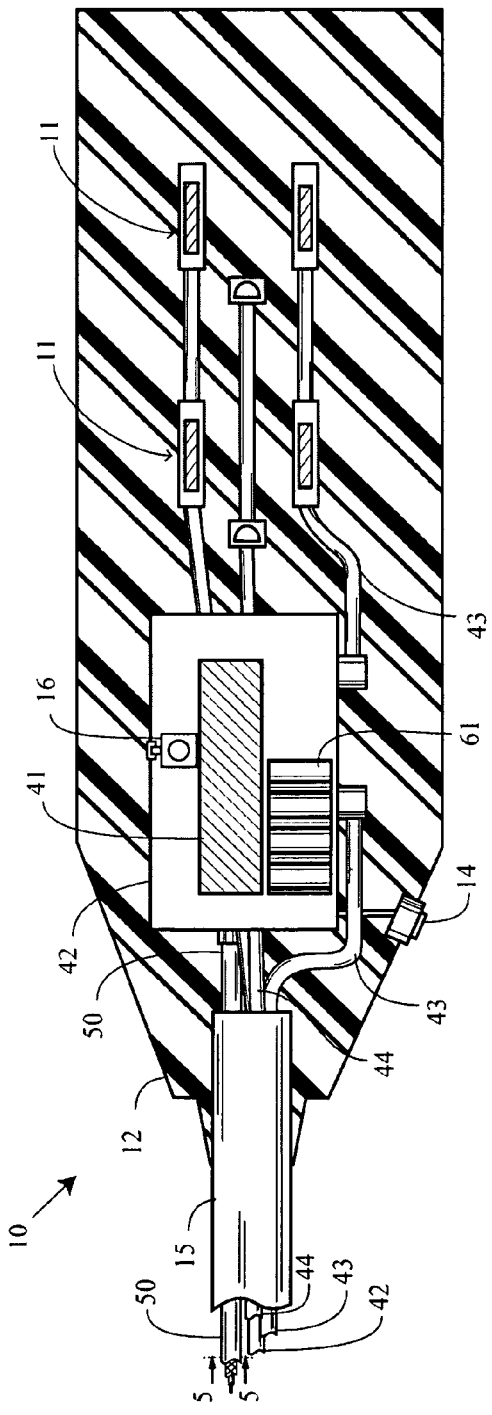
FIG. 4 is a sectional view of the apparatus shown in FIG. 3 taken along the line 4-4.
Figure 6:
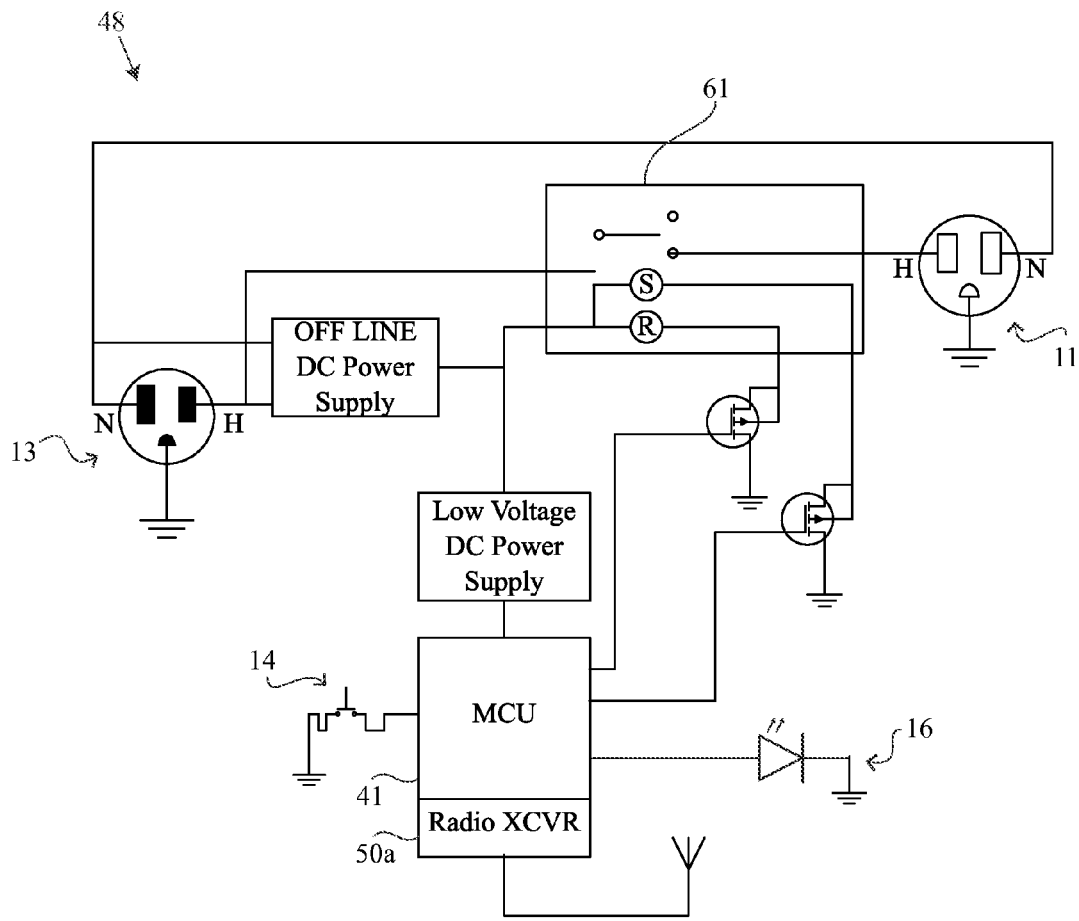
FIG. 6 is a circuit diagram of an apparatus for controlling power to an electrically powered device.

In FIG. 4, the interior components of the apparatus 10 are shown and in FIG. 6 a circuit block diagram for the apparatus 10 is shown. The apparatus 10 further comprises at least a radio transceiver 50a, a microprocessor 41, a switch 61, and a power converter. Additionally, light-emitting diodes (LED) 16 provide status indication.

The plug 13 is used to receive alternating current (AC) power, and the switch 61 is connected in between the socket 11 and the plug 13.

The microprocessor 41 receives direct current (DC) power, decodes a control signal from a remote control, such as a handheld device, via the radio transceiver 50a, and then controls the switch 61 based on the decoded control signal.

The switch 61 is preferably a latching relay controlled by the microprocessor 41, according to the control signal received from the remote control device. The latching relay minimizes the power usage of the electrical device connected to the apparatus 10, independent of the state of the switch 61.

Further embodiments of the present invention include additional onboard energy storage, with sensing or measuring capabilities, in various form factors embedded or interfaced with various electrical components such as, but not limited to; cords, outlets, converters, circuit breakers and surge protectors. Additional embodiments of the present invention include combining a single or multiple energy harvesting sources to provide power to control the relay.

In the preferred embodiment, the radio transceiver 50a preferably includes an antenna 50 positioned within the cord 15 in order to increase the reception power of transceiver. In addition to the antenna, the cord 15 also comprises of three wires 42-44 (hot, neutral and ground), which are further detailed in FIG. 5. The antenna runs parallel in the power cord for increased performance.

Figure 5:
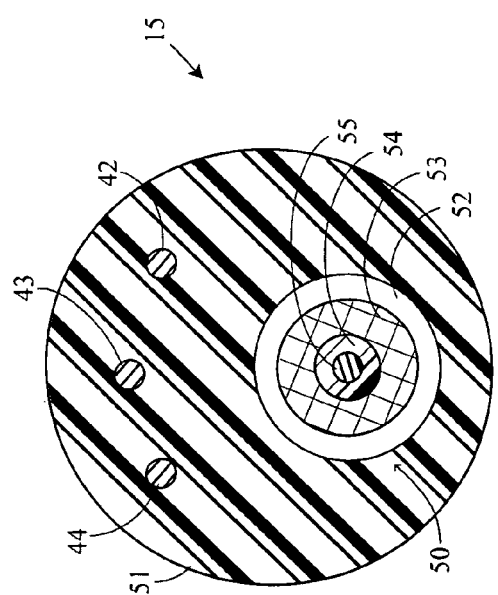
FIG. 5 is a sectional view of the cord shown in FIG. 4 taken along the line 5-5.

FIG. 5 shows the internal components of the cord 15. There are conductors for the three wires 42-44 for the socket and a fourth encased conductor 55 for the antenna 50, all preferably molded within insulating material 51. The antenna 50 preferably comprises of a protective sleeve 52, a shielding copper braid 53, foam 54, and a copper conductor 55; or other such materials typically used to protect the antenna 50 from interference of the other wires 42-44. Further, the antenna 50 is preferably positioned as far as possible from the three other wires 42-44 to minimize the interference from the wires 42-44.

The apparatus 10 of this embodiment preferably has two controlled sockets 11 located on the front of the module. The casing 12 is preferably injection molded insulating material. Both sockets 11 are controlled with the same ON/OFF command. The apparatus 10 is comparable in function and usability to standard extension cords and plugs. The mechanical interactions for the user using the apparatus 10 does not compromise safety or functionality compared to standard extension cords and plugs. The apparatus 10 plugs securely into a single outlet of a standard duplex wall receptacle and the plug 13 is configured in such a way that the other outlet is not impeded. Each socket 11 of the apparatus 10 preferably has a current rating of 15 amperes (A) at 120 volts in alternating current (V AC).

A pushbutton switch 14 on the apparatus 10, when activated, preferably resets the apparatus 10 to the factory default conditions for the configuration settings.

The apparatus 10 has a LED indicator 16 that is ON when the apparatus 10 obtains and maintains a wireless connection to the LAN (local area network) and OFF when the apparatus 10 does not have a wireless connection to the LAN.

The LED indicator 16 also preferably represents the state of the outlet power for the apparatus 10 as well, which is preferably accomplished by blinking in a set pattern. Alternatively, the LED indicator 16 flashes accordingly to indicate the status of the wireless connection.

In the event of a power failure, the apparatus 10 automatically returns managed sockets 11 to the previous state, prior to power interruption. In the event of a dropped wireless connection, the apparatus 10 maintains port settings last set by the user, prior to the loss of wireless connectivity, until the wireless connectivity is restored or until the user disconnects the apparatus 10.

Figure 19:
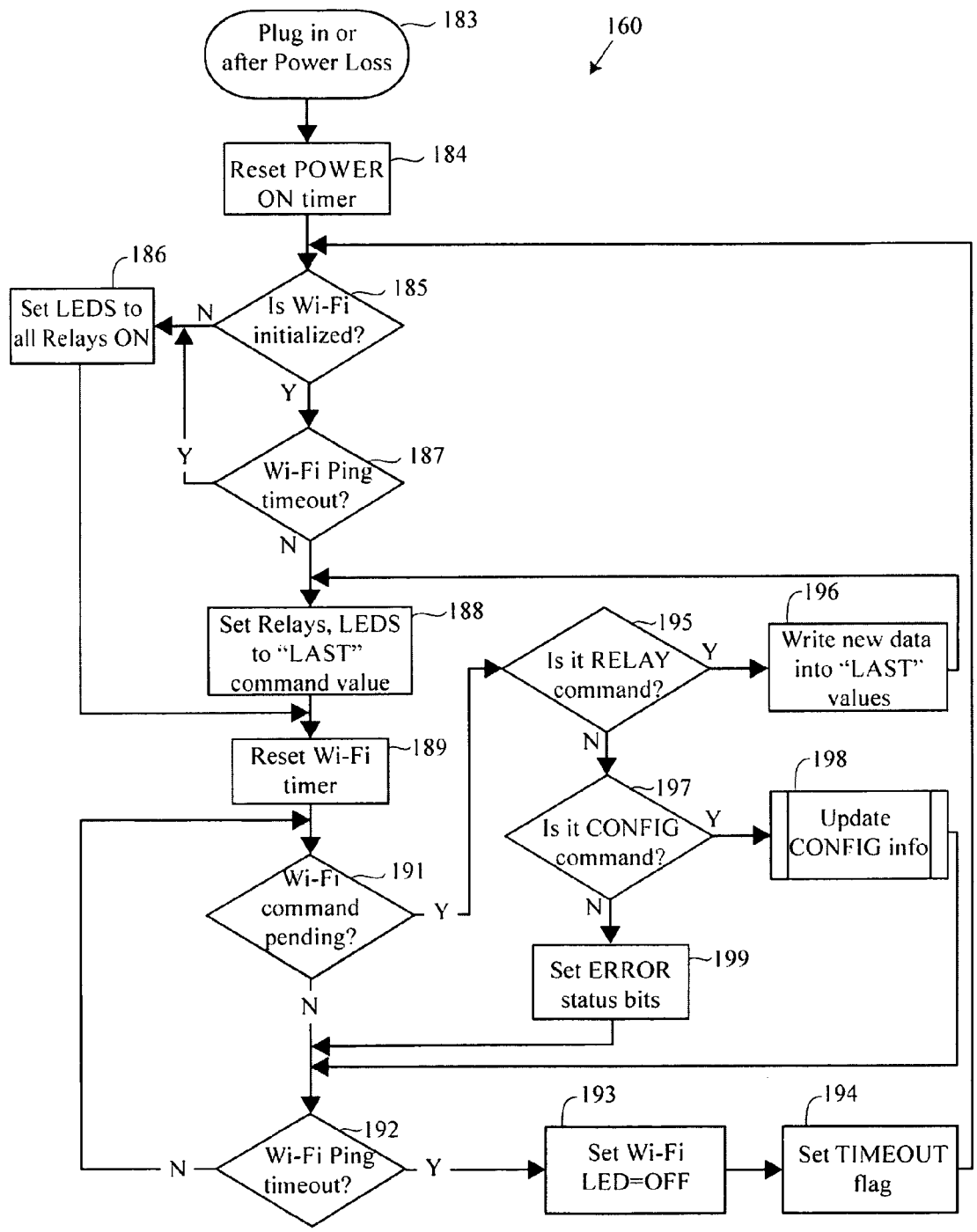
FIG. 19 is a flow chart of control logic for a method for controlling power to an electrically powered device.

A procedure for initializing an apparatus is shown in FIG. 19. At block 183, after a power loss or when the apparatus 10 is plugged in, the microcontroller 41 executes a program 160 for initializing the apparatus 10. At block 184, the POWER ON timer is reset.

At decision 185, if the Wi-Fi is not initialized, the LEDs for all of the relays are set to ON and the apparatus is the Wi-Fi timer is reset at block 189, which times the seconds passed since the last ping.

If the Wi-Fi is initialized at decision block 185 and there is no ping timeout at decision block 187, then the relays are set to the last command value before the loss of power 188. If there is a ping timeout at decision block 187 then the relays are set to ON a block 186, and then the Wi-Fi timer is reset at block 189.

After resetting the Wi-Fi timer at block 189, the program 160 checks for any pending Wi-Fi commands at decision block 191.

If there are no pending Wi-Fi commands at decision block 191 and no ping timeouts at decision block 192, then the program 160 returns to check for a Wi-Fi command at decision block 191. If there is a ping timeout at decision block 192 then the Wi-Fi LED indicator 16 is set to OFF at block 193 and the timeout flag is set at block 194. Then the program 160 returns to the Wi-Fi initialization step at decision block 185.

If there are pending Wi-Fi commands at block 191 and there is a relay command at decision block 195, then the new data from the command is written into the "LAST" command values block 196 and the program 160 returns to setting the relays and LED to the "LAST" command value at block 188. If there is no relay command at decision block 195 then the program 160 checks for a CONFIG command at decision block 197.

If there is a CONFIG command at decision block 197, then the configuration information is updated at block 198 and the program 160 returns to checking for ping timeouts at decision block 192.

If there is no CONFIG command at decision block 197, then ERROR status bits are set and the program 160 returns to checking for ping timeouts at decision block 192.

Figure 7:
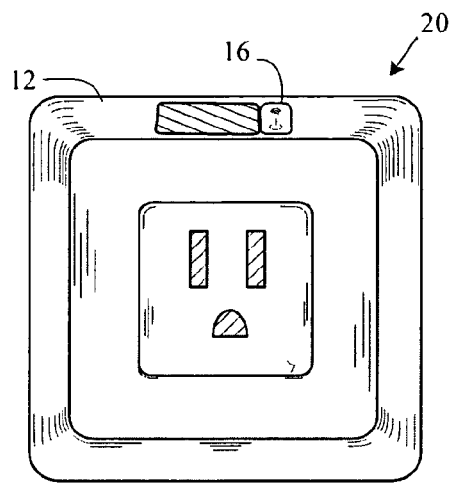
FIG. 7 is a front view of an alternative embodiment of an apparatus for controlling power to an electrically powered device.
Figure 8:
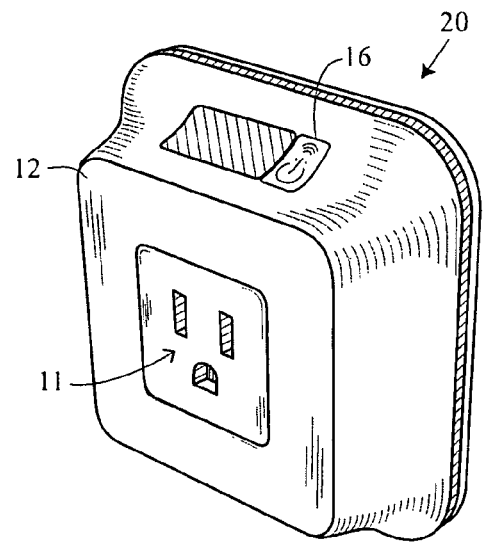
FIG. 8 is a side perspective view of the apparatus of FIG. 7.
Figure 9:
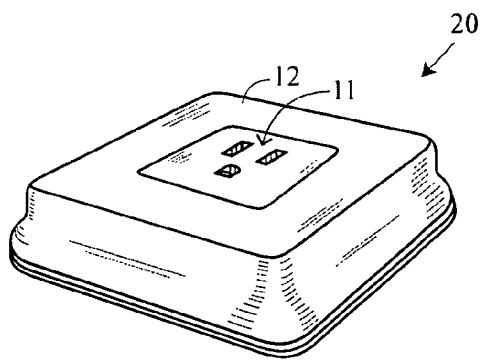
FIG. 9 is a top perspective view of the apparatus of FIG. 7.
Figure 10:
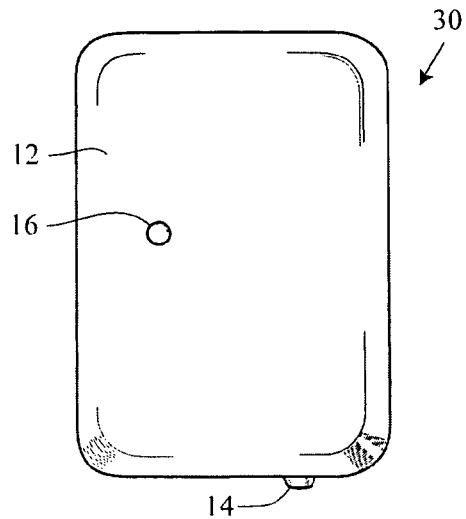
FIG. 10 is a front view of an alternative embodiment of an apparatus for controlling power to an electrically powered device.
Figure 11:
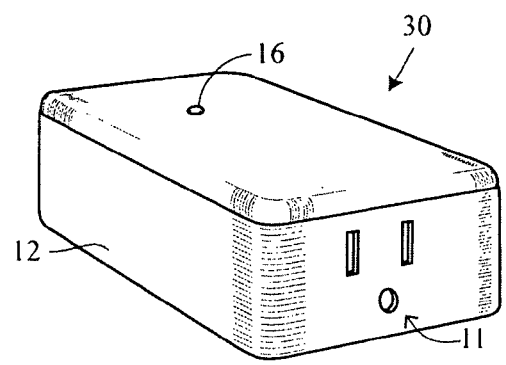
FIG. 11 is a top perspective view of the apparatus of FIG. 10.
Figure 12:
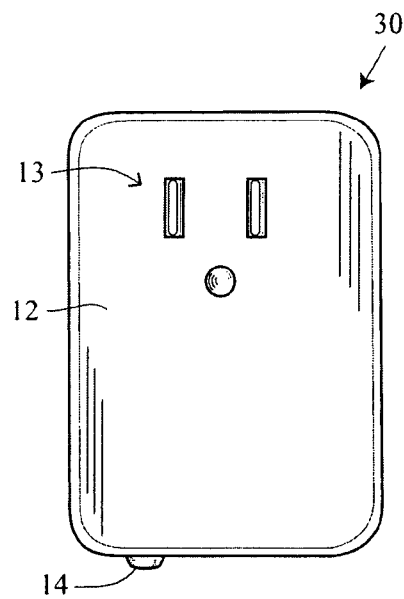
FIG. 12 is a back view of the apparatus of FIG. 10.
Figure 13:
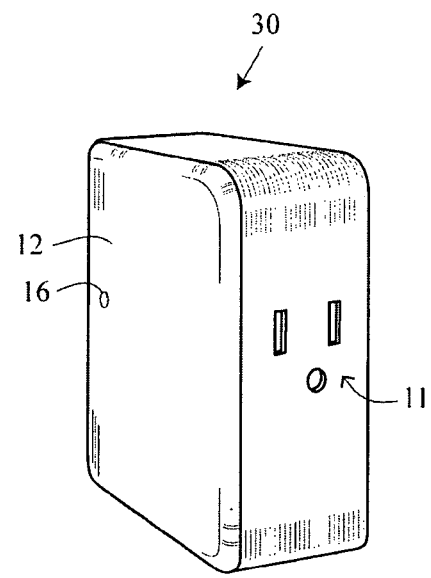
FIG. 13 is a side perspective view of the apparatus of FIG. 10.

An alternative embodiment of an apparatus 20 utilized for controlling power to an electrically powered device is shown in FIGS. 7-9, in the form of a compact box style receptacle.

Yet another alternative embodiment of an apparatus 30 utilized for controlling power to an electrically powered device is shown in FIGS. 10-13, in the form of a compact box style receptacle.

The alternative embodiments are similar to the preferred embodiment, the distinction being in the physical type, and/or shape.

The apparatus 20/30 is preferably shaped as a rectangle and is approximately 2 inches×2 inches×1.5 inches. The apparatus 20/30 preferably has two controlled sockets 11 located on the sides of the module. The casing 12 is preferably injection molded insulating material. Both sockets 11 are controlled with the same ON/OFF command. The apparatus 20/30 is comparable in function and usability to standard extension cords and plugs. The mechanical interactions for the user using the apparatus 20/30 does not compromise safety or functionality compared to standard extension cords and plugs. The apparatus 20/30 plugs securely into a single outlet of a standard duplex wall receptacle and the plug 13 is configured in such a way that the other outlet is not impeded. Each socket 11 of the apparatus 20/30 has a current rating of 15A at 120V AC.

The apparatus 20/30 has a LED indicator 16 that is ON when the apparatus 20/30 obtains and maintains a wireless connection to the LAN (local area network) and OFF when the apparatus 20/30 does not have a wireless connection to the LAN.

In the event of a power failure, the apparatus 20/30 automatically returns managed sockets 11 to the previous state, prior to power interruption. In the event of a dropped wireless connection, the apparatus 20/30 maintains port settings last set by the user, prior to the loss of wireless connectivity, until the wireless connectivity is restored or the user disconnects the apparatus 20/30.

A pushbutton switch 14 on the apparatus 20/30, when activated, preferably resets the apparatus 20/30 to the factory default conditions for the configuration settings.

Figure 14:
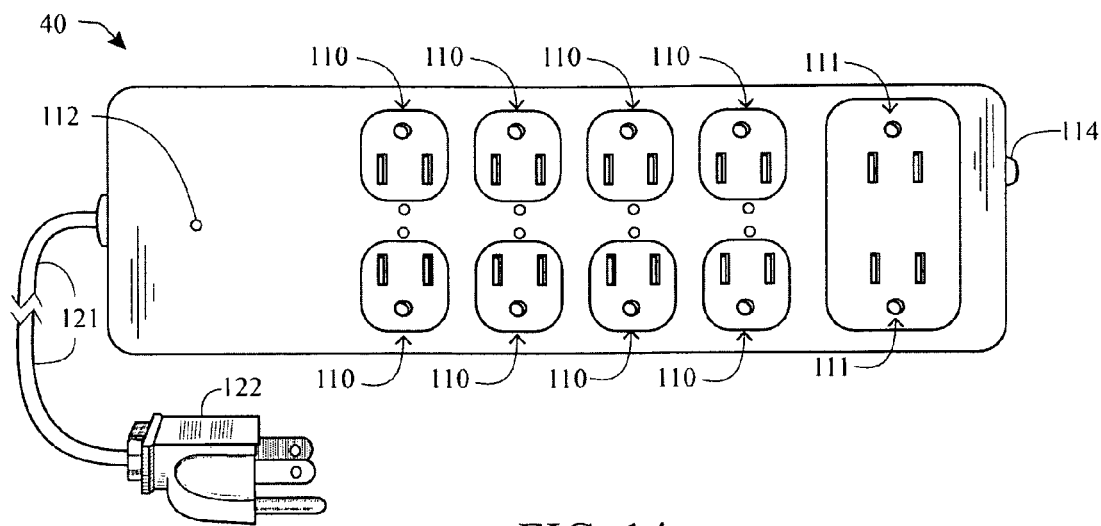
FIG. 14 is a front view of an alternative embodiment of an apparatus for controlling power to an electrically powered device.
Figure 15:
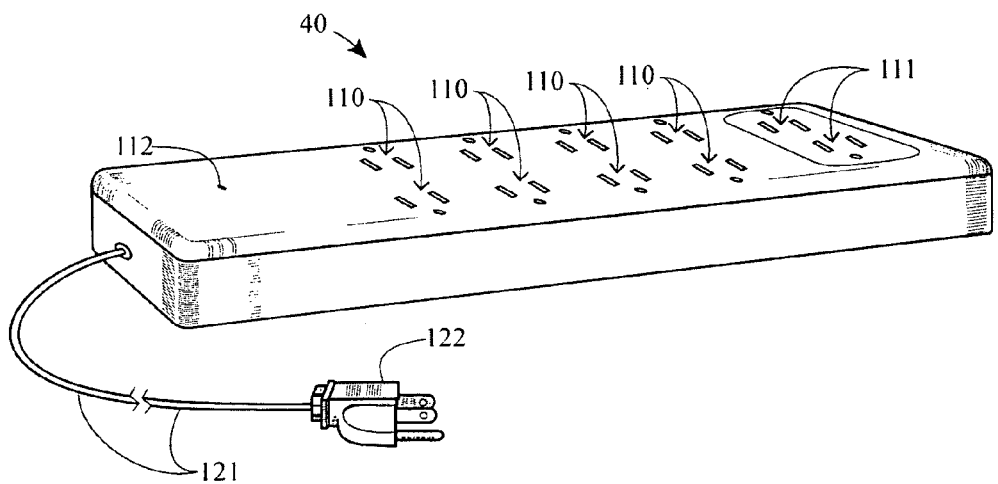
FIG. 15 is a side perspective view of the apparatus of FIG. 14.

Yet another embodiment of an apparatus 40 utilized for controlling power to an electrically powered device is shown in FIGS. 14-15, in the form of a power strip.

The embodiment of FIGS. 14-15 is another variation of the apparatus 10 in the form of a power strip. The apparatus 40 is shaped similarly to currently available power strips. The casing 12 is preferably injection molded insulating material. The apparatus 40 preferably has six independently controlled sockets 110 and two sockets which remain constantly ON 111. The device is comparable in function and usability to standard power strips and plugs. The mechanical interactions for the user using the apparatus 40 does not compromise safety or functionality compared to standard extension cords and plugs.

The apparatus 40 plugs securely into a single outlet of a standard duplex wall receptacle and the plug 13 is configured in such a way that the other outlet is not impeded. Each socket 110-111 of the apparatus 40 preferably has a current rating of 15A at 120V AC.

The apparatus 40 has a LED indicator 112 that is ON when the device obtains and maintains a wireless connection to the LAN (local area network) and OFF when the device does not have a wireless connection to the LAN.

In the event of a power failure, the apparatus 40 automatically returns managed sockets 110 to the previous state, prior to power interruption. In the event of a dropped wireless connection, the apparatus 40 maintains port settings last set by the user, prior to the loss of wireless connectivity, until the wireless connectivity is restored or the user disconnects the apparatus 40.

A pushbutton switch 114 on the device 40, when activated, preferably resets the device 40 to the factory default conditions for the configuration settings.

Figure 16:
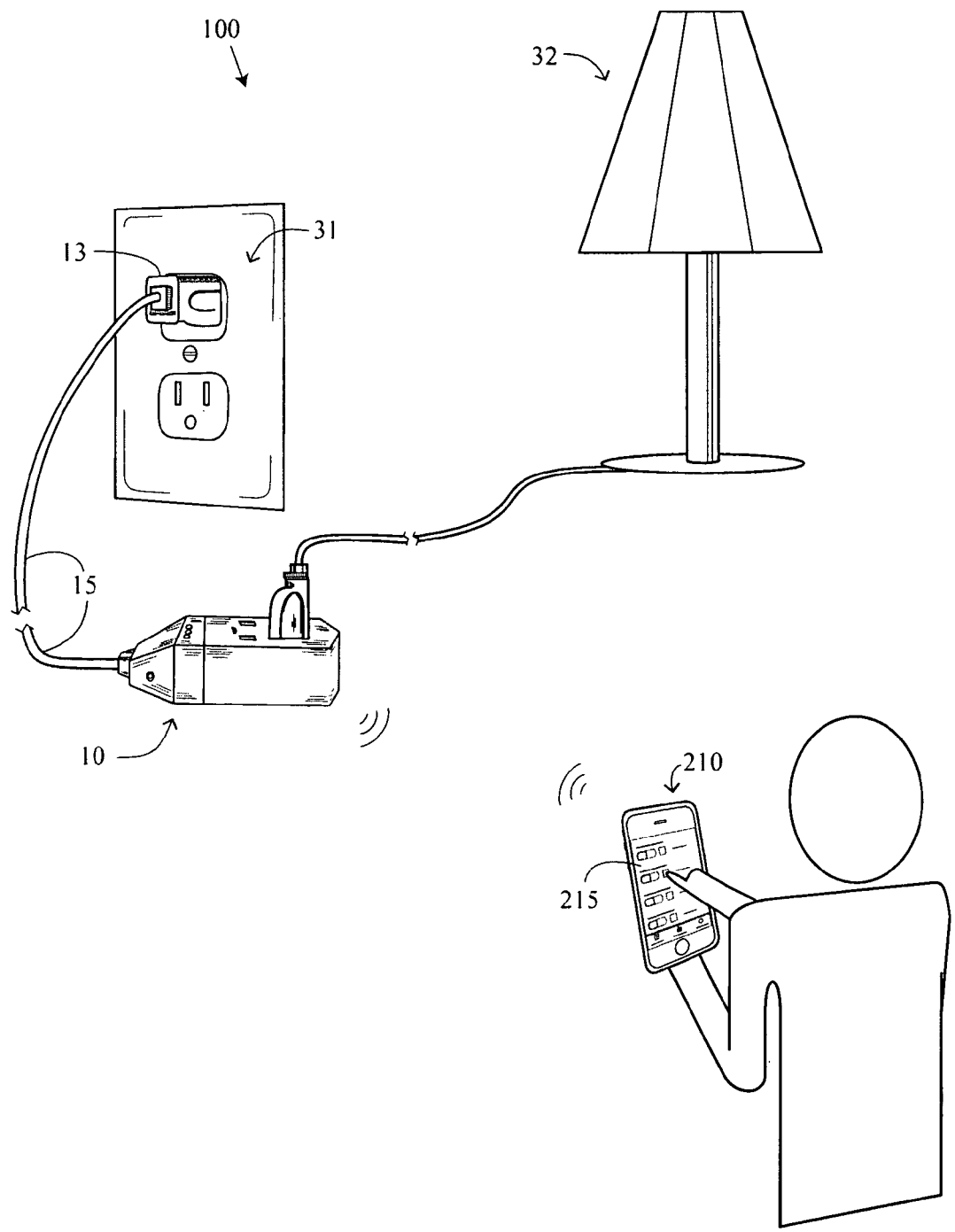
FIG. 16 is a frontal elevation view of FIG. 1 connected to a wall receptacle at one end and to a lamp at the opposite end, and a user controlling the apparatus with a wireless device.

A system 100 of the preferred embodiment is shown in FIG. 16. A table lamp 32 is plugged into one of the sockets 11 of the apparatus 10, and the plug 13 at the other end of the cord 15 of the apparatus 10 is plugged into a typical wall outlet 31. A user controls the lamp 32 from a distance using the touch screen commands 215 on a smartphone 210. A WiFi signal is sent from the smartphone 210 and received at the antenna 50, not shown in FIG. 16, of the transceiver of the cord 15. The WiFi signal instructs the microprocessor 41 of the apparatus 10 to deactivate the electrical power to the table lamp 32.

Figure 18:
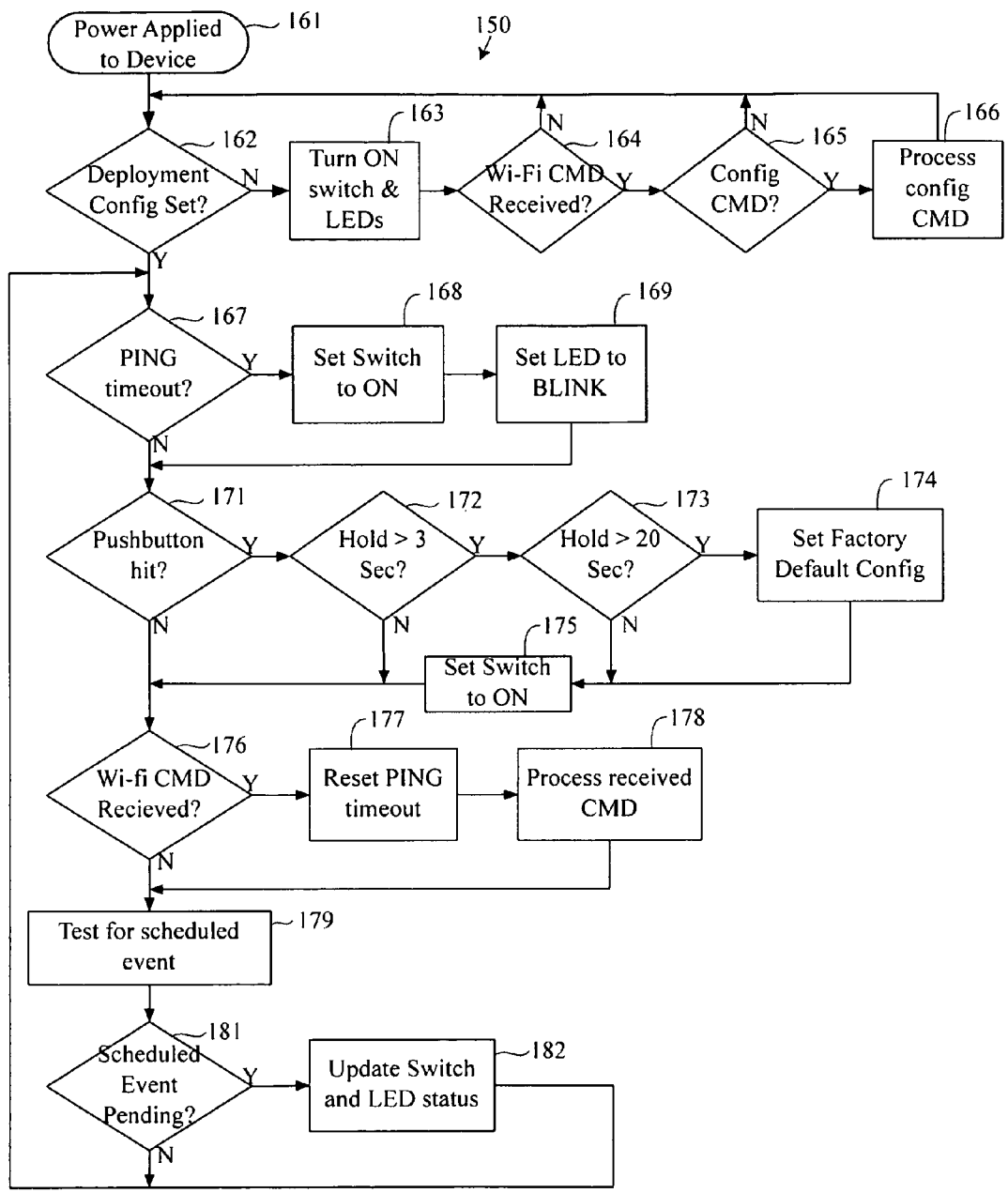
FIG. 18 is a flow chart of control logic for a method for controlling power to an electrically powered device.

When the apparatus 10 is connected to electrical power from the wall outlet at block 161, the microcontroller 41 executes a program 150, which is shown in FIG. 18.

If the deployment configuration is not set up at decision block 162 on the apparatus 10, then the switch 61 and the LED are turned on at block 163. If there is a no Wi-Fi command received at decision block 164, then the program 150 returns to check for the deployment configuration at decision block 162. If there is a Wi-Fi command received at decision block 164 but there is no configuration command at decision block 165, then the program 150 returns to check the deployment configuration at decision block 162. If there is a configuration command at decision block 165, then the configuration command is processed block 166 and the program 150 returns to check the deployment configuration at decision block 162.

If the deployment configuration is set up at decision block 162 and there are ping timeouts at decision block 167, then the switch 61 is set to ON at block 168 and the LED 16 is set to blink at block 169.

If there are no ping timeouts at decision block 167, then the program 150 checks if the pushbutton 14 was triggered at decision block 171. If the pushbutton 14 was held for more than 3 seconds at decision block 172 but less than 20 seconds at decision block 173, then the switch 61 is set to ON at block 175. If the pushbutton 14 was held for more than 20 seconds at decision block 173, then the factory default configuration is set at block 174 and the switch 61 is set to ON at block 175. If the pushbutton 14 was held for less than 3 seconds at decision block 172 then the program 150 moves on to the next step at decision block 176.

If a Wi-Fi command is received at decision block 176 then the ping timeout is reset block 177 and the command received is processed at block 178. Then the program 150 moves on to the next step block 179.

If a Wi-Fi command is not received at decision block 176, then the program 150 tests for scheduled events block 179.

If there is a scheduled event pending at decision block 181 then the switch 61 and LED 16 statuses are updated block 182 and the program 150 returns to check for ping timeouts decision block 167.

If there are no scheduled events pending decision block 181 then the program 150 returns to check for ping timeouts decision block 167.

Figure 20:
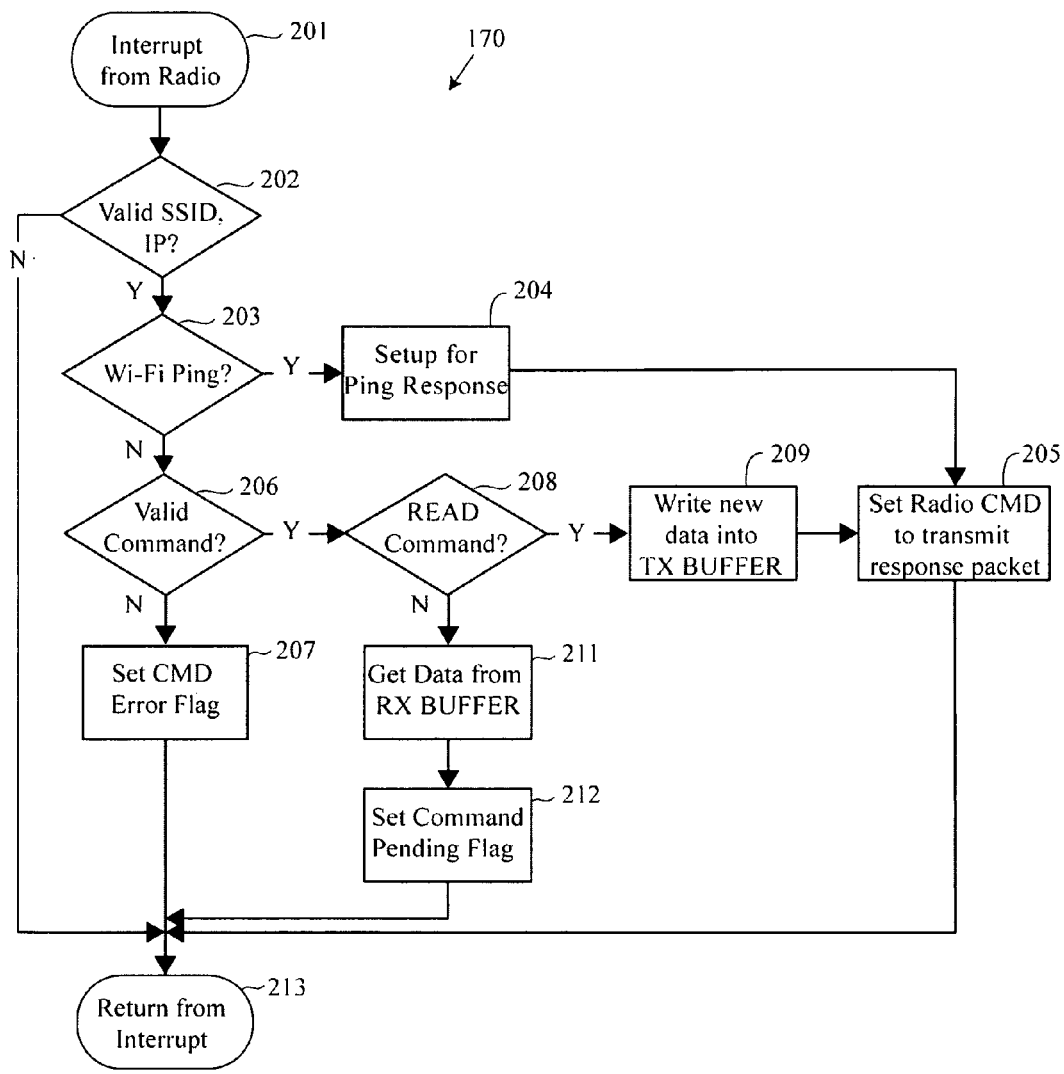
FIG. 20 is a flow chart for an interrupt command for an apparatus for controlling power to an electrically powered device.

In FIG. 20, a program 170 is executed when the microcontroller 41 receives an interrupt signal at block 201 from the radio 50; i.e., when the apparatus 10 receives a command, as in FIG. 16.

If the SSID and the IP (Internet Protocol) address are valid t decision block 202, and there is a Wi-Fi ping at decision block 203, then a ping response at block 204 is set up. The radio command is set to transmit a response packet at block 205, and then the interrupt service routine (ISR) returns at block 213.

If there is no Wi-Fi ping decision block 203 and the command is not valid decision block 206, then the command ERROR flag is set block 207 and the ISR returns at block 213.

If the command is valid decision block 206 and the read command is executed at decision block 208, the new data is written into the transmit (TX) buffer at block 209 and the radio command is set to transmit a response packet at block 205, and the ISR returns at block 213.

If the READ command is not executed at decision block 208, then data is retrieved from the receive (RX) buffer at block 211, the command PENDING flag is set at block 212, and the ISR returns at block 213.

The apparatus 10 permits the user to configure the apparatus 10 out of the box using a web user interface (WebUI), a personal computer ("PC") program or a WiFi enabled hand held device (smartphone) via ad-hoc wireless, allowing the user to program in home network information, such as the wireless router SSID (Service Set Identifier) and security keys, as necessary for web connectivity.

Figure 17:
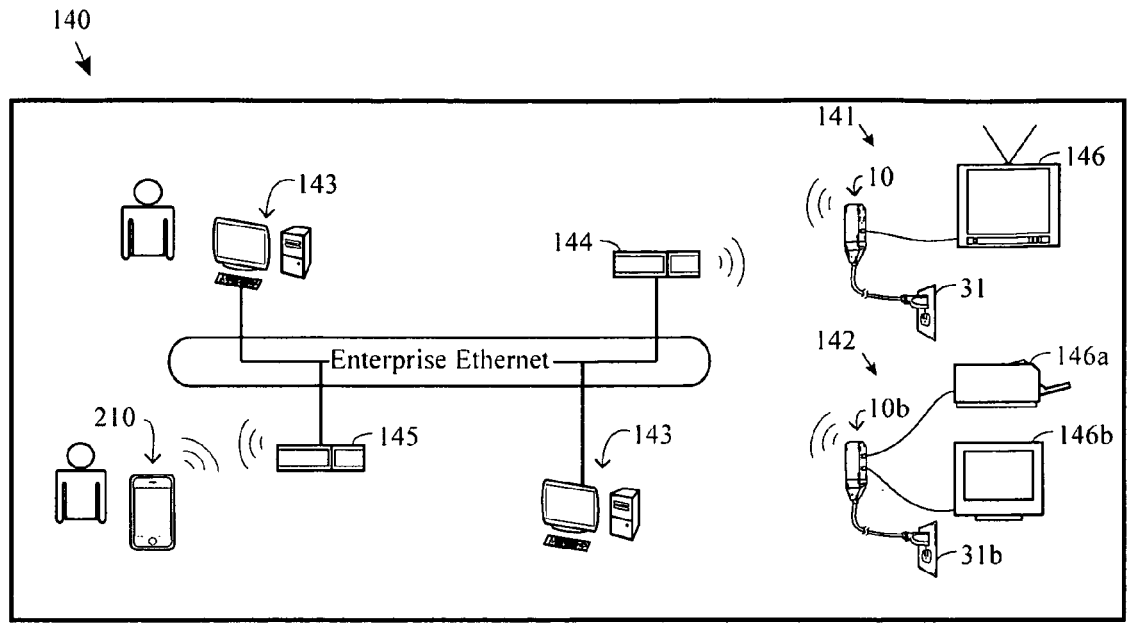
FIG. 17 is a block diagram of a system for controlling power to an electrically powered device.

A networked system 140 of the preferred embodiment is shown in FIG. 17.

Figure 17A:
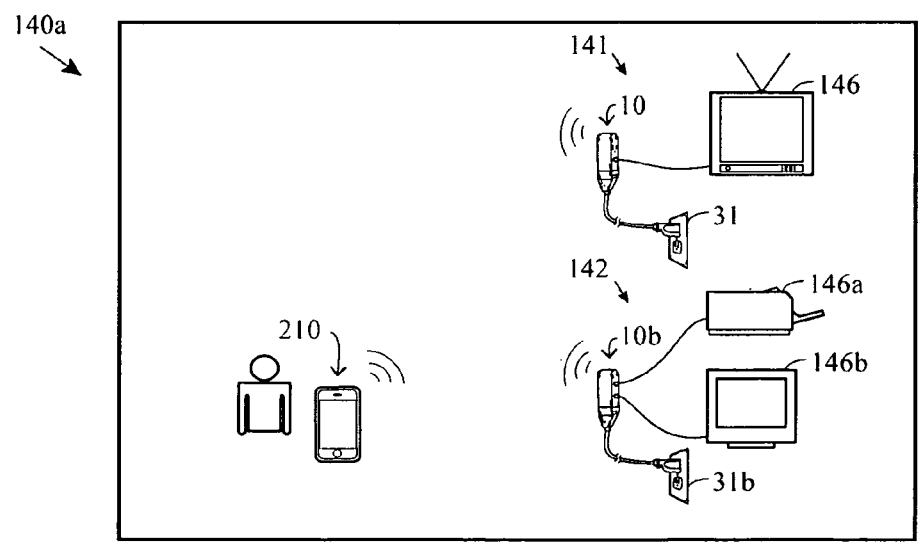
FIG. 17A is a block diagram of a system for controlling power to an electrically powered device.

The WebUI is preferably hosted on the apparatus 10 and is accessible via interconnected network devices. The WebUI, PC program or WiFi enabled hand held is addressable via the assigned IP address of the apparatus 10. The apparatus 10 can be controlled from various devices such as, but not limited to, computers 143 or mobile handhelds 210. In a typical network, the router 144 and the access point 145 provide the wireless connectivity between the apparatus 10 and the remote, such as a smart phone 210. An alternative embodiment of the system 140 is illustrated in FIG. 17A. In this embodiment, the mobile handheld device 210 wireless communicates directly with the antenna 50 of the apparatus 10 preferably using a WiFI communication protocol.

Figure 21:
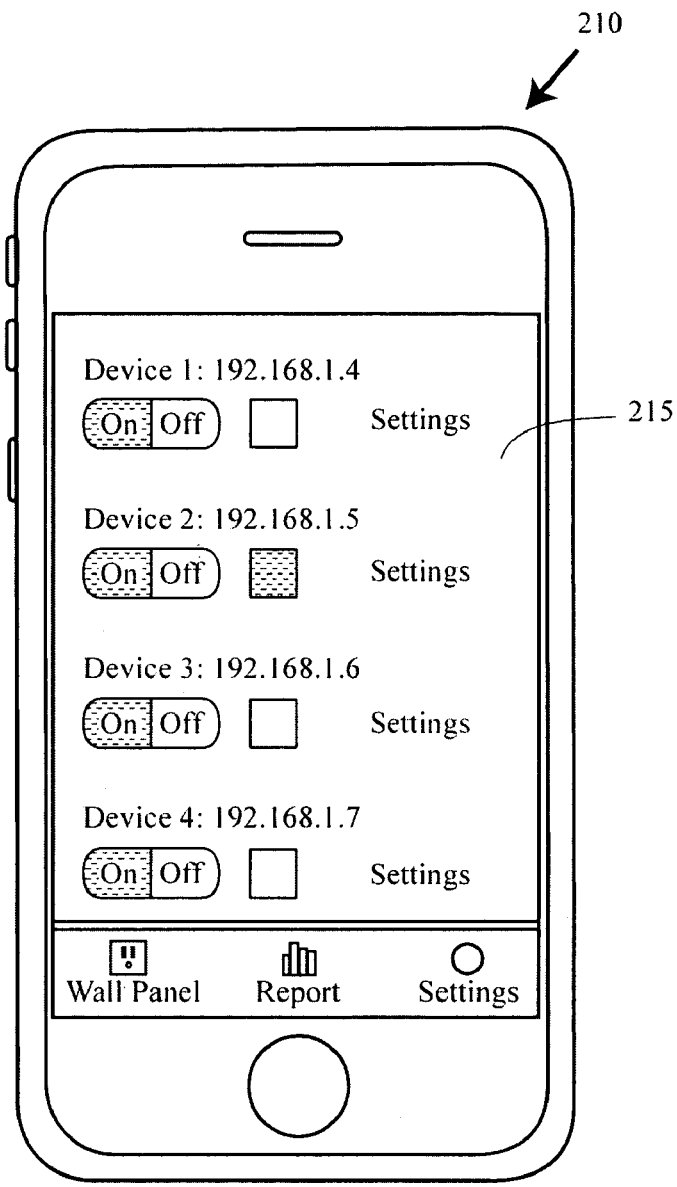
FIG. 21 is a front view of a smart phone for use with a system for controlling power to an electrically powered device.

FIG. 21 shows a smart phone 210 displaying touch screen commands 215 of an application for controlling power to electrically powered devices plugged into the apparatus 10.

In FIG. 17, a system 141 shows a television 146 plugged into the first installed apparatus 10, which is plugged into a wall outlet 31. Another system 142 shows a printer 146a and a monitor 146b plugged into a secondary apparatus 10b, which is plugged into a wall outlet 31b.

The first installed apparatus 10 is the master apparatus 10 and monitors the network for any additional apparatus 10b. When a new apparatus 10b is detected on the network, the first apparatus 10 remotely manages other apparatus 10b using a single WebUI, PC program or WiFi enabled hand held. The user will either: a) logon to the original apparatus 10 and have selectable tabs and additional options to manage all of the apparatus 10b on the network; or b) manage each apparatus 10b discretely using individual IP addresses. Local user settings to the individual apparatus 10b supersede commands and/or timers from the master apparatus 10. The apparatus 10 is compatible with various web browsers such as, but not limited to, Mozilla Firefox, Microsoft Explorer and Google Chrome.

Figure 22:
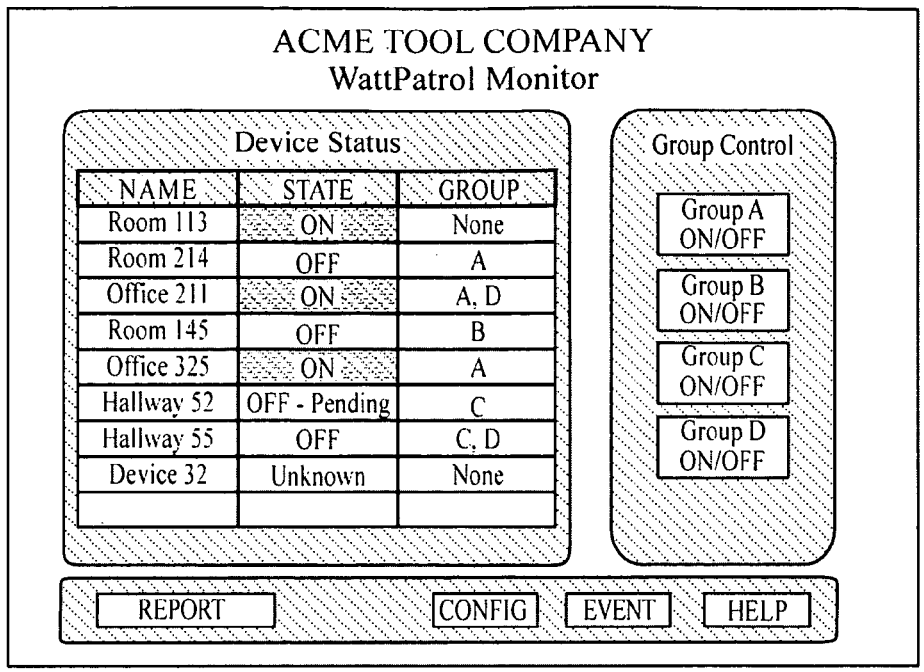
FIG. 22 is a screen view of a status chart of a system for controlling power to an electrically powered device.

A simple WebUI home page allows individual management and supervision of each socket 11 such as, but not limited to, setting multiple timers and toggling ON/OFF selections of individual sockets 11. An example of a web page, of a status window 190, is shown in FIG. 22. The status page 190 displays the status of the devices and users can turn devices OFF or ON from this page.

Figure 23:
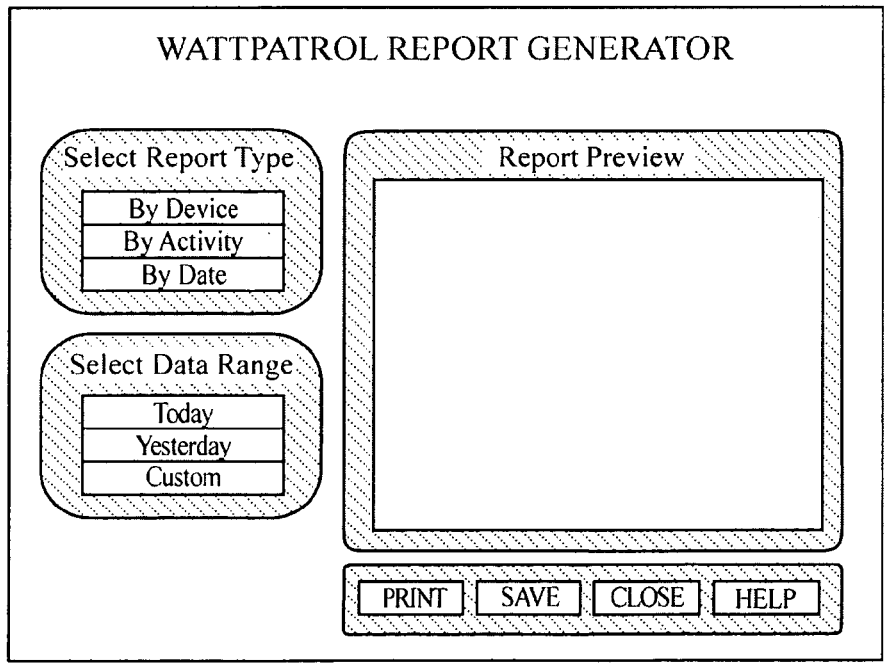
FIG. 23 is a screen view of a report generated by a system for controlling power to an electrically powered device.

FIG. 23 shows another example of a web page, a report window 200 that a user can access to generate a report in order to analyze or compare the consumption of energy by devices or activities or dates.

Figure 24:
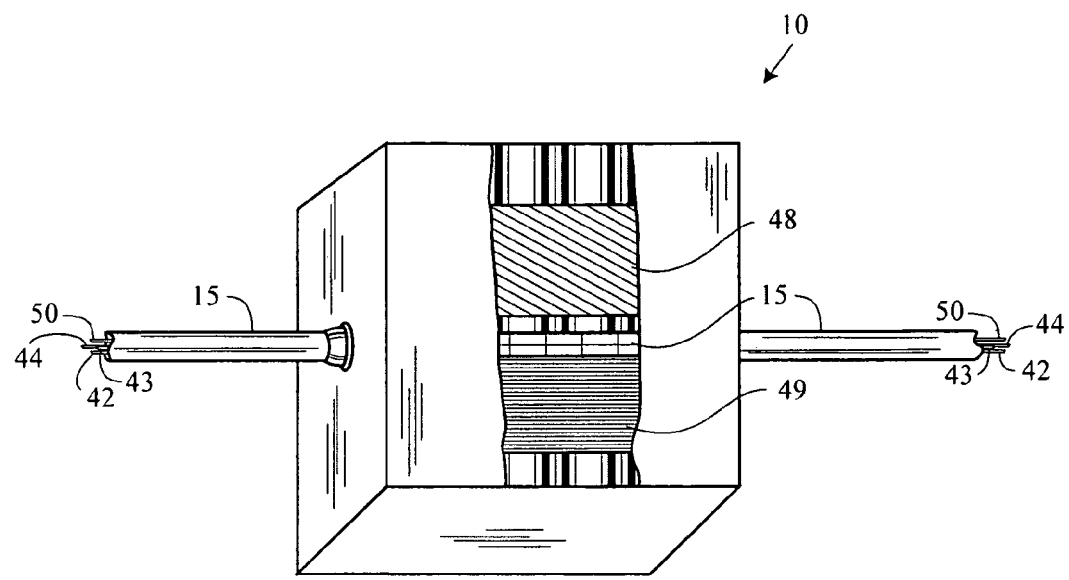
FIG. 24 is an elevational view of a cord embodiment of an apparatus with a junction box in a center region of the cord with exposed hot, neutral and ground wires.

Yet another embodiment of the present invention is illustrated in FIG. 24. In this embodiment, the apparatus 10 is a junction box with a cord 15 having the three wires 42-44 and the antenna 50. The junction box contains a high power relay 49 and most of the circuitry 48 shown in reference to FIG. 6. The loose wires 42-44 can be hard wired to various electrical powered devices and a fixed (household) power source or a mobile (generator) power source. The junction box is preferably a 4 inch×4 inch non-metallic box. The junction box embodiment can be utilized with 115 volt applications, 220 volt applications and three-phase applications.

Figure 24A:
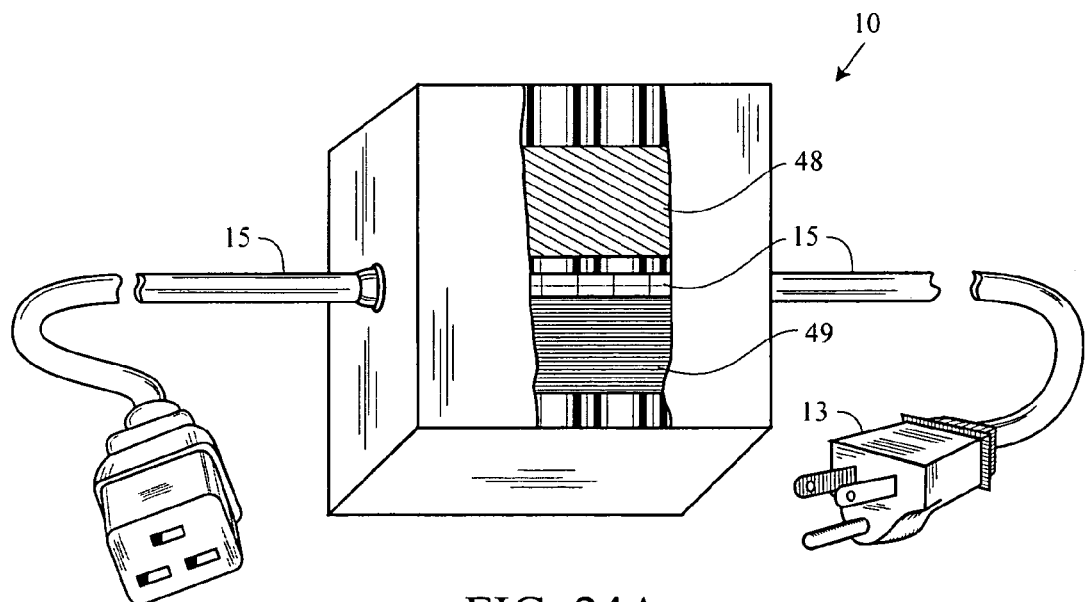
FIG. 24A is an elevational view of a cord embodiment of an apparatus with a junction box in a center region of the cord.

Yet another embodiment is shown in FIG. 24A. In this embodiment, the apparatus 10 is a junction box with a cord 15 connected to plug 13 on one end and a socket on the other end. The junction box contains a high power relay 49 and most of the circuitry 48 shown in reference to FIG. 6. The junction box is preferably a 4 inch×4 inch non-metallic box. The junction box embodiment can be utilized with 115 volt applications, 220 volt applications and three-phase applications.

Figure 25:
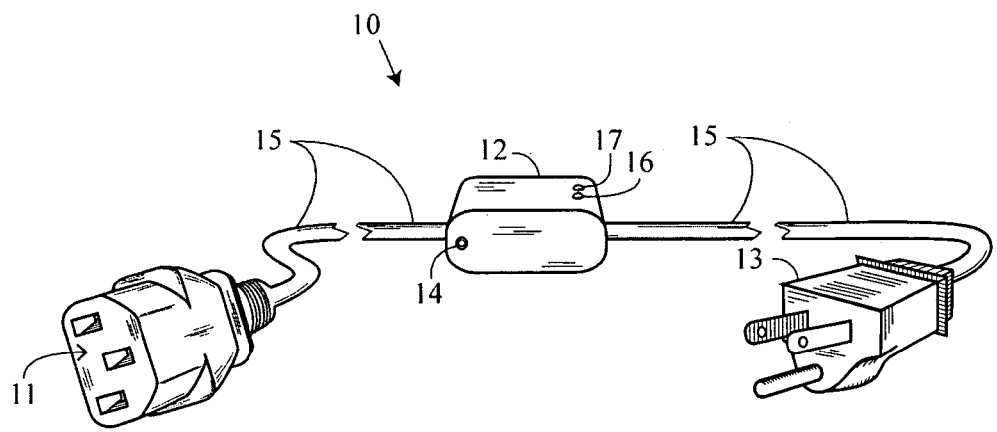
FIG. 25 is an elevational view of a cord embodiment of an apparatus with circuitry in a center region of the cord.

Yet another embodiment is illustrated in FIG. 25. In this embodiment, the apparatus has a cord 15 with the circuitry is in a central region of the cord 15 and shown as a bulge 12 in the cord 15. The cord has a plug 13 on one end and a socket 11 on the other end. A pushbutton switch 14 on the apparatus 10, when activated, preferably resets the apparatus 10 to the factory default conditions for the configuration settings. The apparatus 10 has a pair of LED indicators 16 and 17 that are ON when the apparatus 10 obtains and maintains a wireless connection to the LAN (local area network) and OFF when the apparatus 10 does not have a wireless connection to the LAN. The LED indicators 16 and 17 also preferably represent the state of the outlet power for the apparatus 10 as well, which is preferably accomplished by blinking in a set pattern. Alternatively, the LED indicators 16 and 17 flashes accordingly to indicate the status of the wireless connection.

Figure 25A:
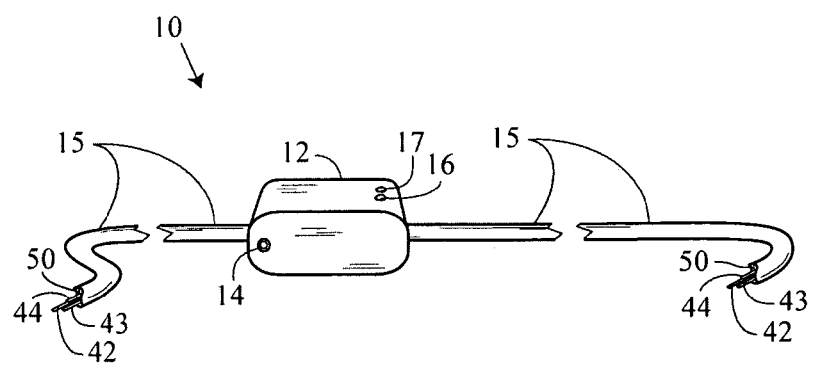
FIG. 25A is an elevational view of a cord embodiment of an apparatus with circuitry in a center region of the cord and both ends of the cord with exposed hot, neutral and ground wires.

Yet another embodiment is illustrated in FIG. 25A. In this embodiment, the apparatus has a cord 15 with the circuitry is in a central region of the cord 15 and shown as a bulge 12 in the cord 15. The cord has the three wires 42-44 and the antenna 50. The loose wires 42-44 can be hard wired to various electrical powered devices and a fixed (household) power source or a mobile (generator) power source. A pushbutton switch 14 on the apparatus 10, when activated, preferably resets the apparatus 10 to the factory default conditions for the configuration settings. The apparatus 10 has a pair of LED indicators 16 and 17 that are ON when the apparatus 10 obtains and maintains a wireless connection to the LAN (local area network) and OFF when the apparatus 10 does not have a wireless connection to the LAN. The LED indicators 16 and 17 also preferably represent the state of the outlet power for the apparatus 10 as well, which is preferably accomplished by blinking in a set pattern. Alternatively, the LED indicators 16 and 17 flashes accordingly to indicate the status of the wireless connection.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A system for controlling electrical power to an electrically-powered device, the system comprising:
    an apparatus comprising
        a cord,
        an alternating current outlet socket for receiving a plug from an electrically-powered device, the alternating current outlet socket located at a first end of the cord
        an alternating current input plug for connection to an outlet to receive power, the alternating current input plug located at a second end of the cord,
        a latching relay for controlling power to the alternating current outlet socket, the latching relay electrically positioned within the cord between the alternating current input plug and the alternating current outlet socket,
        a processor configured to instruct the latching relay to enable electrical power to the alternating current outlet socket and to disable electrical power to the alternating current outlet socket, and
        a transceiver for wirelessly receiving a plurality of commands to the apparatus utilizing a WIFI communication protocol, and for wirelessly transmitting data from the apparatus utilizing a WIFI communication protocol, the transceiver in electrical communication with the processor, the transceiver comprising an antenna extending along a substantial portion of a length of the cord;
    an electrically-powered device, the electrically-powered device connected to the alternating current outlet socket of the apparatus; and
    a controller for wirelessly transmitting a plurality of commands to the at least one apparatus utilizing a WIFI communication protocol;
    wherein a command of the plurality of commands from the controller can control electrical power to the electrically powered device through the processor of the apparatus which is configured to control electrical power to the electrically powered device from the alternating current outlet socket.

2. The system according to claim 1 further comprising at least one wireless router for receiving each of the plurality of commands from the controller and wirelessly transmitting each of the plurality of commands to the transceiver of the apparatus.

3. The system according to claim 1 wherein the antenna of the transceiver extends along the entire length of the cord.

4. The system according to claim 1 wherein the length of the cord ranges from four feet to ten feet, and the processor, latching relay and transceiver are located in a center region of the cord.

* * * * *